US012687239B2

(12) United States Patent  
Mornacchi et al.

(10) Patent No.: US 12,687,239 B2  
(45) Date of Patent: Jul. 21, 2026

(54) DIRECT DRIVE VALVE

(71) Applicant: Microtecnica S.r.l., Turin (IT)

(72) Inventors: Andrea Mornacchi, Turin (IT); Enrico Quaglia, Turin (IT); Dario Savino, Palazzolo Vercellese (IT)

(73) Assignee: Microtecnica S.r.l., Turin (IT)

( * ) Notice: Subject to any disclaimer, the term of this patent is extended or adjusted under 35 U.S.C. 154(b) by 0 days.

(21) Appl. No.: 18/824,421

(22) Filed: Sep. 4, 2024

(65) Prior Publication Data

US 2025/0092960 A1 Mar. 20, 2025

(30) Foreign Application Priority Data

Sep. 19, 2023 (EP) .................................... 23198374

(51) Int. Cl.
| | |
|---|---|
| *F16K 31/42* | (2006.01) |
| *F15B 13/04* | (2006.01) |
| *F15B 13/043* | (2006.01) |
| *F16K 11/07* | (2006.01) |

(52) U.S. Cl.
CPC ........ *F16K 31/426* (2013.01); *F15B 13/0403* (2013.01); *F15B 13/0435* (2013.01); *F16K 11/07* (2013.01)

(58) Field of Classification Search
CPC .... F16K 31/426; F16K 11/07; F15B 13/0403; F15B 13/0435; F15B 13/0402; F15B 2013/0412
See application file for complete search history.

(56) References Cited

U.S. PATENT DOCUMENTS

| | | | |
|---|---|---|---|
| 2,981,288 A | 4/1961 | Strader | |
| 4,649,956 A | 3/1987 | Zeuner et al. | |
| 10,717,517 B2 | 7/2020 | Lassalle et al. | |
| 10,865,905 B2 | 12/2020 | Kopp | |
| 10,900,502 B2 | 1/2021 | Otth et al. | |
| 11,408,443 B2 | 8/2022 | Jaskiewicz | |
| 2005/0132877 A1* | 6/2005 | Hart ...................... B64C 13/505 | |
| | | | 91/509 |
| 2012/0192975 A1 | 8/2012 | Lehner et al. | |
| 2023/0140241 A1* | 5/2023 | Tanaka ................ F16K 31/1226 | |
| | | | 137/625.48 |

FOREIGN PATENT DOCUMENTS

| | | |
|---|---|---|
| EP | 0256648 A2 | 2/1988 |
| GB | 2133583 A | 7/1984 |
| WO | 8303455 A1 | 10/1983 |
| WO | 9002884 A1 | 3/1990 |

OTHER PUBLICATIONS

European Search Report for Application No. 23198374.3, mailed Feb. 16, 2024, 7 pages.

\* cited by examiner

*Primary Examiner* — Kelsey E Cary

(74) *Attorney, Agent, or Firm* — Kilpatrick Townsend & Stockton LLP

(57) ABSTRACT

A direct drive valve for controlling fluid flow, includes a flow spool operable to control fluid flow through the direct drive valve; a control spool located within the flow spool and an actuator operable to drive the control spool relative to the flow spool. The direct drive valve is configured such that in use movement of the control spool relative to the flow spool causes the flow spool to be actuated by fluid pressure.

10 Claims, 9 Drawing Sheets

DIRECT DRIVE VALVE

CROSS-REFERENCE TO RELATED APPLICATIONS

This application claims the benefit of European Patent Application No. 23198374.3 filed Sep. 19, 2023, the disclosure of which is incorporated herein by reference in its entirety.

FIELD

The present disclosure relates to a direct drive valve for controlling fluid flow and a method of controlling a direct drive valve for controlling fluid flow.

BACKGROUND

Valves are used for controlling hydraulic fluid in a hydraulic circuit. In the field of aircraft, and in particular flight control system actuators, valves are required that are capable of high performance in terms of both bandwidth and stall load.

That is, a valve that controls the hydraulic fluid supplied to an actuator of a flight control system must be capable of a fast response time to a control input and capable of high flow throughput.

Traditional direct drive valves consist of an actuator, e.g. a motor, directly actuating a spool within a housing to open and close ports within the housing to control hydraulic fluid through said ports.

As hydraulic flow forces increase (e.g. due to increased hydraulic flow) the fluid forces acting on the spool increase (e.g. linearly). Therefore, to achieve high flow rates through a valve, the power generated by the actuator must be increased to handle the increased fluid forces. However, high power actuators increase the size and weight of the valve.

Thus, improvements are desirable for direct drive valves that are capable of very high fluid flow rates.

SUMMARY

According to a first aspect of the invention, a direct drive valve for controlling fluid flow is provided, comprising: a flow spool operable to control fluid flow through the direct drive valve; a control spool located within the flow spool; and an actuator operable to drive the control spool relative to the flow spool, wherein the direct drive valve is configured such that in use movement of the control spool relative to the flow spool causes the flow spool to be actuated by fluid pressure.

Optionally, the flow spool comprises a pressure port for cooperation with the control spool, wherein the pressure port is configured to receive supply fluid; the control spool comprises a first land configured to prevent fluid flow through the pressure port when the pressure port and the first land are aligned, and the flow spool and the control spool are configured such that in use movement of the control spool relative to the flow spool in a first direction causes the first land to permit fluid flow through the pressure port such that the pressure port is in fluid communication with a second chamber for driving the flow spool in the first direction, and movement of the control spool relative to the flow spool in a second direction causes the first land to permit fluid flow through the pressure port such that the pressure port is in fluid communication with a first chamber for driving the flow spool in the second direction.

Optionally, the actuator comprises a shaft that extends through the flow spool and is attached to the control spool for actuating the control spool.

Optionally, the shaft extends through both the flow spool and the control spool.

Optionally, the actuator comprises a motor configured to drive the control spool using the shaft.

Optionally, the control spool is located further from the motor than the flow spool.

Optionally, the flow spool is configured to provide fluid flow of 200 litres per minute or greater through the valve.

Optionally, the direct drive valve comprises a position sensor configured to detect a position of the control spool and/or the flow spool.

Optionally, the direct drive valve comprises a second flow spool operable to control fluid flow through the direct drive valve; and a second control spool located within the second flow spool, wherein the actuator is operable to drive the second control spool relative to the second flow spool, wherein the direct drive valve is configured such that in use movement of the second control spool relative to the second flow spool causes the second flow spool to be actuated by fluid pressure.

According to a second aspect of the invention, there is provided a method of controlling a direct drive valve for controlling fluid flow, comprising: supplying fluid to the direct drive valve, the direct drive valve comprising a flow spool operable to control fluid flow through the direct drive valve, and a control spool located within the flow spool; and controlling fluid flow through the direct drive valve by driving the control spool relative to the flow spool and thereby actuating the flow spool by fluid pressure.

Optionally, the method comprises actuating the flow spool relative to the control spool using fluid pressure and thereby returning the flow spool to an initial relative position with the control spool and hence stopping actuation by the fluid pressure.

Optionally, the method may comprise using the direct drive valve of the first aspect.

BRIEF DESCRIPTION OF THE DRAWINGS

Some exemplary embodiments of the present disclosure will now be described by way of example only and with reference to the accompanying drawings, in which.

DETAILED DESCRIPTION

Figure 1:
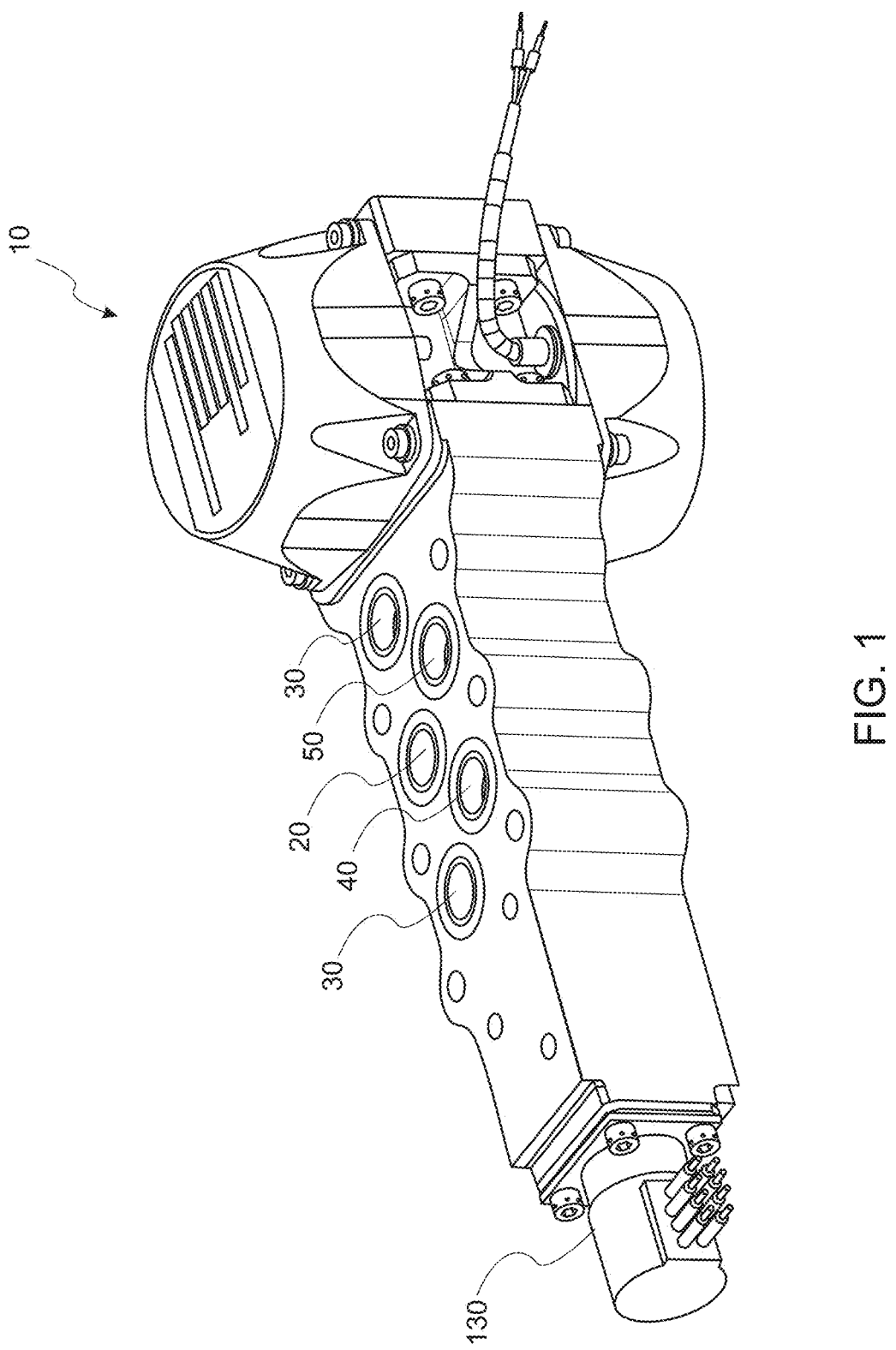
FIG. 1 shows a direct drive valve.

As described herein, according to the first aspect of the invention a direct drive valve for controlling fluid flow is provided, comprising: a flow spool operable to control fluid flow through the direct drive valve; a control spool located within the flow spool; and an actuator operable to drive the control spool relative to the flow spool, wherein the direct drive valve is configured such that in use movement of the control spool relative to the flow spool causes the flow spool to be actuated by fluid pressure.

Thus, movement of the control spool actuates the flow spool by controlling (e.g. permitting or preventing) fluid flow within the direct drive valve, such that fluid pressure is applied to the control spool to thereby actuate it. Advantageously, the force the actuator may be capable of is not required to be as large as would be necessary if the actuator were directly attached to the flow spool, since in use the flow spool is not directly driven by the actuator and instead the flow spool is driven by fluid pressure. In contrast, in conventional systems the actuator directly drives a spool which controls fluid flow (analogous to the present flow spool), and hence the force needed from the actuator is proportional to the fluid flow rate through the valve, such that increased flow rates require greater force and therefore a larger, heavier actuator. In the direct drive valve of the present disclosure though, the actuator drives the control spool, which in turn uses fluid pressure (from supply fluid already provided to the valve) to actuate the flow spool. Thus, an increased flow rate is possible without the need to correspondingly increase the power, size and weight of the actuator. Hence the present invention is particularly advantageous in the field of aircraft (e.g. flight control system actuators), in which flow circuits are increasingly requiring higher stall loads, since the requirements of the actuator in terms of force that can be applied is no longer directly proportional to the flow rate. Further, as the actuator directly drives the control spool the direct drive valve has a high bandwidth, i.e. frequency response.

In essence, the present invention, by way of its architecture, provides a means of amplifying the force from the actuator whilst maintaining high bandwidth. Thought of another way, the direct drive valve leverages the existing fluid pressure to actuate the flow spool and thereby may be smaller and lighter than other valves for a predetermined flow rate.

The direct drive valve may be considered as a direct drive valve since the actuator acts directly to drive the control spool. The direct drive valve may be considered to be a direct drive valve with a hydromechanical follow-up architecture as the actuator acts directly to drive the control spool which in turn causes the flow spool to be driven by fluid pressure e.g. hydraulic forces.

Movement of the control spool relative to the flow spool may cause the flow spool to be driven in the same direction as the control spool due to fluid pressure. The flow spool may be driven by the fluid pressure in the same direction as the control spool, and it may be driven the same distance as the control spool. Thus, movement of the control spool from a first position to a second position may cause corresponding movement of the flow spool from the first position to the second position. Movement of the control spool from the second position to the first position may cause corresponding movement of the flow spool from the second position to the first position. Movement of the flow spool may therefore follow movement of the control spool, and may copy that movement.

Upon relative movement of the control spool (compared to the flow spool) out of a neutral (e.g. equilibrium) position, the fluid pressure within the direct drive valve may drive the flow spool back into the neutral (e.g. equilibrium) position. Fluid pressure acting on the flow spool thus restores the relative position of the flow spool with the control spool. The movement of the flow spool may therefore be considered a type of 'follow-up' movement. The direct drive valve may therefore be configured so that movement of the control spool relative to the flow spool causes fluid pressure to be applied to the flow spool to thereby actuate it until the fluid pressure is no longer applied. The flow spool may therefore return to an equilibrium position with the control spool in which forces from the fluid pressure do not actuate the flow spool. The flow spool may therefore move until fluid pressures are balanced i.e. return to a stationary position.

The control spool and the flow spool may be tubular and may be arranged concentrically with at least a portion of the flow spool being positioned radially outwards of the control spool. The control spool and flow spool may be arranged about a common axis i.e. they may be coaxial. The control spool and the flow spool may be driven along the same axis.

Arranging the control spool and flow spool concentrically advantageously allows the direct drive valve to be more compact than would otherwise be possible. Furthermore, this allows for a faster dynamic output, i.e. the time between a control input and the flow spool opening or controlling the respective ports.

The flow spool may control fluid flow through the direct drive valve by permitting and preventing fluid flow through fluid ports depending upon its position within the direct drive valve. For example, the flow spool may comprise lands arranged to seal the fluid ports, such that actuation of the flow spool moves those lands out of registration with the fluid ports of the direct drive valve to thereby place predetermined of the fluid ports in fluid communication, and hence permit and prevent fluid flow through the valve as required. The fluid ports may be sized appropriately to ensure that a sufficient rate of flow (e.g. sufficiently high) through the direct drive valve is possible.

The direct drive valve may comprise a supply port, a return port, a first control port and a second control port. The supply port may be configured to receive supply fluid, e.g. high-pressure fluid (at higher pressure than a return side). The direct drive may comprise a plurality of return ports e.g. two return ports. The return port may be configured to receive return fluid e.g. output fluid to fluid tank, sump, reservoir, drain or the like. The return fluid pressure may be lower than the supply fluid pressure. The first control port and second control port may be configured to receive fluid from the supply port, and to provide fluid to the return port, depending upon the position of the flow spool. The first control port and second control port may therefore be for supplying and receiving fluid to and from an actuator e.g. for a flight control surface or other flight control system actuator. The return port may be for receiving fluid from the first control port and second control port depending upon the position of the flow spool. The position of the flow spool may determine which of the supply port, return port, first control port and second control port are in fluid communication with each other, for actuating a flight control system actuator.

The flow spool may be configured to prevent fluid communication between any of the supply port, return port, first control port and second control port when in a first position within a sleeve of the direct drive valve. The flow spool may be configured to fluidly couple the supply port to the first control port and the return port to the second control port when in a second position within the sleeve. The flow spool may be configured to fluidly couple the supply port to the second control port and the return port to the first control port when in a third position within the main cylinder. Thus, the flow spool may be configured to control fluid communication between the fluid ports of the direct drive valve depending upon its position, to thereby control fluid flow through the direct drive valve for controlling an actuator.

The direct drive valve may be for controlling hydraulic fluid. The direct drive valve may be for controlling fluid flow in an aircraft. The direct drive valve may be for controlling fluid flow to and from an aircraft actuator. The direct drive valve may be for controlling fluid flow to and from an aircraft control surface actuator. Thus, the direct drive valve may be operable to actuate an actuator of e.g. a flight control system.

The control spool may be configured to permit and/or prevent fluid flow through a port (e.g. a pressure port) of the flow spool to thereby drive the flow spool. The control spool may be actuable to place different fluid volumes in the direct drive valve in fluid communication with a supply of pressurised fluid and thereby drive the flow spool. For example, movement of the control spool in a first direction may supply pressurised fluid to a second chamber to thereby drive the flow spool in the first direction. Movement of the control spool in a second direction may supply pressurised fluid to a first chamber to thereby drive the flow spool in the second direction. The direct drive valve may be configured such that the flow spool is driven by fluid supply that is caused by relative movement of the control spool (compared to the flow spool) until the flow spool closes the supply of such fluid. The flow spool may therefore be automatically driven by supplied fluid to return to an equilibrium with the control spool i.e. the flow spool may move to match the movement of the control spool and thereby prevent the supply of driving fluid to the flow spool, such that the relative position of the flow spool compared to the control spool is restored.

The direct drive valve may comprise a valve housing. The sleeve may be located within the housing. The sleeve may be attached to the valve housing. The valve housing may comprise the supply port, return port, first control port and second control port. The valve housing may comprise passageways for providing fluid communication from one or more of the supply port, return port, first control port, and second control port to the sleeve. The sleeve may be interposed between the flow spool and the housing. The flow spool may be located within the sleeve.

The valve housing may comprise mounting points for fastening the valve within an aircraft. The mounting points may be in the form of drilled holes in the valve housing for receiving fasteners, or may be any suitable mounting mechanism.

The flow spool may comprise a pressure port for cooperation with the control spool, wherein the pressure port is configured to receive supply fluid; the control spool may comprise a first land configured to prevent fluid flow through the pressure port when the pressure port and the first land are aligned, and the flow spool and the control spool may be configured such that in use movement of the control spool relative to the flow spool in a first direction causes the first land to permit fluid flow through the pressure port such that the pressure port is in fluid communication with a second chamber for driving the flow spool in the first direction, and movement of the control spool relative to the flow spool in a second direction causes the first land to permit fluid flow through the pressure port such that the pressure port is in fluid communication with a first chamber for driving the flow spool in the second direction.

Thus, movement of the control spool in either direction will cause movement of the flow spool in the corresponding direction and the flow spool will thereby return to an equilibrium position with the control spool (the flow spool may always return to the equilibrium position). In the equilibrium position, the first land of the control spool seals the pressure port and fluid pressure on the flow spool is balanced. The control spool and flow spool will therefore remain in the equilibrium position until the control spool is driven relative to the flow spool, thereby opening the pressure port and consequently driving the flow spool.

The pressure port may be smaller than other fluid ports of the direct drive valve e.g. may have a smaller cross-section. It may be smaller than the supply port, return port, first control port, and/or second control port. As such, less force may be needed to drive the control spool than would be needed to drive the flow spool directly. The supply port, return port, first control port and second control port can therefore be larger (and provide a greater flow rate) for a predetermined actuator size (e.g. motor size) than if the actuator had to drive the flow spool directly. The direct drive valve instead uses the fluid pressure to drive the flow spool. Thus, in a sense the direct drive valve is configured to amplify the driving force from the actuator using the fluid pressure. In this way, a greater fluid flow can be achieved for a given actuator (e.g. motor) size.

The first chamber and second chamber may be alternately in fluid communication with the pressure port, so that the flow spool is driven in either the first direction or the second direction. When the control spool and the flow spool are in a neutral position (i.e. the equilibrium position) the pressure port is not in fluid communication with either the first chamber or the second chamber and the flow spool does not move. When the control spool opens the pressure port, fluid pressure may be increased in either of the first chamber or the second chamber to thereby drive the flow spool in the first or second directions. The flow spool will be driven by the fluid pressure until the pressure port is closed again. The flow spool therefore follows the control spool and its relative position with the control spool is restored.

The flow spool may comprise a return port. The flow spool and the control spool may be configured such that in use when the first chamber is in pressure communication with the pressure port the second chamber is in communication with the return port and when the second chamber is in pressure communication with the pressure port the first chamber is in communication with the return port. The flow spool may comprise a plurality of return ports e.g. two return ports. The return ports may be located either side of the pressure port, and may be for respective communication with the first chamber and the second chamber.

The pressure port may be configured to provide pressure communication between an exterior of the flow spool and an interior of the flow spool. The pressure port may be configured to provide pressure communication between an exterior of the flow spool and a volume between an inner surface of the flow spool and outer surface of the control spool. Thus, the flow spool and control spool may cooperate to provide a portion of a flow path between the pressure port and the first chamber, and between the pressure port and the second chamber, depending upon the relative position of the control spool to the flow spool.

The volume between the inner surface of the flow spool and the outer surface of the control spool may be divided into a first control volume and a second control volume by the control spool land. The first control volume and the second control volume may be fluidly isolated from each other e.g. by the first land of the control spool.

The control spool may comprise a first return land and the first control volume may be bounded by the first land, the inner surface of the flow spool, the outer surface of the control spool and the first return land.

The control spool may comprise a second return land and the second control volume may be bounded by the first land, the inner surface of the flow spool, the outer surface of the control spool and the second return land.

The first and second chambers may be bounded by an exterior surface of the flow spool and an interior surface of another part of the direct drive valve e.g. a stationary part such as the sleeve and/or housing.

The flow spool may comprise a first radial protrusion and a second radial protrusion. The first radial protrusion and the second radial protrusion may extend radially from the exterior surface of the flow spool. The first radial protrusion and the second radial protrusion may extend to another part of the direct drive valve e.g. a stationary part such as the sleeve and/or housing and may form a fluid seal where they meet. The first radial protrusion and the second radial protrusion may be axially spaced from each other long the length of the flow spool. The first radial protrusion and the second radial protrusion may be located either side of the pressure port. The first radial protrusion and the second radial protrusion may be configured to provide movement of the flow spool when pressurised fluid is supplied to the first and second chambers as described herein.

A surface of the first radial protrusion may form at least a portion of the exterior surface of the flow spool that bounds the first chamber. A surface of the second radial protrusion may form at least a portion of the exterior surface of the flow spool that bounds the second chamber.

The flow spool may comprise a first chamber port that is configured to provide pressure communication between the first chamber and the first control volume, and hence between the first chamber and the pressure port.

The flow spool may comprise a second chamber port that is configured to provide pressure communication between the second chamber and the second control volume, and hence between the second chamber and the pressure port.

The first land, the first return land and the second return land may be configured such that in use: when the pressure port is in communication with the first chamber the second chamber is in communication with the return port; and when the pressure port is in communication with the second chamber the first chamber is in communication with the return port.

The first and second chambers are configured such that in use higher pressure in one of the first and second chamber acts to force the flow spool in the first or second direction corresponding to movement of the control spool.

Higher pressure in the first chamber may cause a pressure differential (e.g. across the second radial protrusion) that urges the flow spool in the second direction. Higher pressure in the second chamber may cause a pressure differential (e.g. across the first radial protrusion that urges the flow spool in the first direction.

In use, movement of the control spool in a first direction causes the first land to unseal the pressure port which thereby causes the second chamber to be subjected to increased pressure, which in turn causes the flow spool to be driven in the same direction as the control spool, i.e. the first direction, until the pressure port and first land are aligned and the increased pressure is hence blocked. Likewise, movement of the control spool in a second direction causes the first land to unseal the pressure port which thereby causes the first chamber to be subjected to increased pressure, which in turn causes the flow spool to be driven in the same direction as the control spool, i.e. the second direction, until the pressure port and first land are aligned and the increased pressure is hence blocked.

The actuator may comprise a shaft (e.g. that extends through the flow spool) attached to the control spool for actuating the control spool relative to the flow spool e.g. by a motor. The shaft may extend longitudinally through the flow spool. The shaft may be mechanically attached to the control spool. The shaft may extend through both the flow spool and the control spool.

The shaft, control spool and flow spool may be arranged concentrically with the shaft at the centre, the control spool radially outwards of the shaft, and at least a portion of the flow spool radially outwards of the control spool. The shaft may extend longitudinally through both the flow spool and control spool. The shaft may not be connected to the flow spool, and thus the shaft may not be actuable to directly drive the flow spool. The shaft may be free to move relative to the flow spool to drive the control spool. The shaft may therefore be actuable to operate the control spool without directly driving the flow spool.

The actuator may comprise a motor configured to drive the control spool using the shaft, or any suitable type of component for actuating the control spool. The motor may be a linear motor or a rotary motor, or any suitable type of motor.

The actuator may comprise a number of motors configured to drive the control spool via the shaft. The actuator may comprise two rotary motors, three rotary motors, four rotary motors, or more. The actuator may comprise two linear motors, three linear motors, four linear motors, or more. For example, the direct drive valve may have a quadruplex electric architecture with four electrical motors acting on the shaft. The valve may alternatively have duplex or triplex redundancy, i.e. the direct drive may have two or three electrical motors acting on the same shaft respectively. The actuator may comprise a combination of linear and rotary motors. The actuator may comprise any suitable arrangement of motors. Advantageously, having a number of motors provides redundancy in the event that one motor fails.

An end of the shaft opposite an end attached to the control spool may be attached to a motor shaft configured to transmit the motor motion to the shaft. The motor shaft may be an eccentric shaft, such that rotary motion of the motor is converted to linear (e.g. reciprocal) motion of the shaft.

The shaft of the actuator may be a flexible shaft, and hence may flex in a direction perpendicular to its movement driving the control spool. Thus, the shaft may bend so that the end of the shaft connected to the motor shaft accommodates rotation of the motor shaft, while the end of the shaft connected to the control spool stays in the same radial position relative to the control spool.

Advantageously the flexible shaft may avoid the need for additional components to convert rotational movement of the motor shaft into linear motion at the control spool.

The motor shaft may be a cam shaft arranged so that rotational motion thereof is converted to reciprocal motion of the shaft driving the control spool. Thus, during use the end of the shaft connected to the motor shaft may rotate away from the axis e.g. may not be coaxial with the control spool and/or flow spool. The shaft may therefore accommodate movement in a direction perpendicular to its length.

An end of the shaft opposite an end attached to the control spool may be attached to a linear motor to transmit the motor motion to the shaft. The shaft of the actuator may be a rigid shaft.

The control spool may be located further from the motor than the flow spool. That is, the portion of the control spool located nearest the motor may be further from the motor than the portion of the flow spool located nearest the motor. The pressure port of the flow spool may therefore be on the other side of the fluid ports from the motor. The pressure port of the flow spool may therefore be located further from the motor than the fluid ports. The shaft may connect the control spool to the motor shaft by extending through the flow spool.

The flow spool may be configured to provide fluid flow of 10, 20, 50, 100, 150, 200 and/or 250 litres per minute or greater through the valve. The direct drive valve may have a nominal flow rate from 50 litres per minute to 250 litres per minute. The fluid ports of the flow spool may be large enough to provide such flow rates through the direct drive valve.

One or more of the supply port, return port, first control port and second control port may be sized to have a flow area of between 1 mm2 and 100 mm2, or between 3 mm2 and 75 mm2. One or more of the supply port, return port, first control port and second control port may be sized to have a flow area of between 1 mm2 and 7 mm2, or between 3 mm2 and 5 mm2 e.g. for a flow rate of approximately 20 litres per minutes. One or more of the supply port, return port, first control port and second control port may be sized to have a flow area of between 10 mm2 and 100 mm2, or between 25 mm2 and 70 mm2, or between 35 mm2 and 60 mm2, or between 45 mm2 and 50 mm2 e.g. for a flow rate of approximately 200 litres per minute. One or more of the supply port, return port, first control port and second control port may be sized to have a flow area of approximately 1 mm2, 10 mm2, 20 mm2, 30 mm2, 40 mm2, 50 mm2, 60 mm2, 70 mm2, 80 mm2, 90 mm2, 100 mm20 or more.

A flow area of between 3 mm2 and 5 mm2 may allow for a flow of 20 l/min through the port. A flow area of between 25 mm2 and 70 mm2 may allow for a flow of 200 l/min through the port.

The size of the flow area of the supply port, return port, first control port and/or second control port may be any suitable size and may be based on one or more of the required supply pressure, dynamic load and stall load.

One or more of the pressure port, first chamber port, second chamber port and return port of the flow spool may be sized to have a flow area of between 0.5 mm2 and 2.5 mm2, or between 1 mm2 and 2 mm2, or between 1.25 mm2 and 1.75 mm2. One or more of the pressure port, first chamber port, second chamber port and return port of the flow spool may be sized to have a flow area of 0.5 mm2, 1.0 mm2, 1.5 mm2, 2.0 mm2, 2.5 mm2, or 3.0 mm2.

The fluid ports may each be larger than the pressure port e.g. may have a larger cross-section and may therefore permit a greater fluid flow therethrough. Each may be 1.5 times, 2 times, 3 times, 5 times, 10 times, or 20 times larger. Thus, the fluid ports may provide a much greater flow rate than the pressure port (or other ports in the control spool).

The fluid may be any suitable fluid, for example a hydraulic fluid.

The direct drive valve may comprise a sensor (e.g. a position sensor) configured to detect a position of the control spool and/or the flow spool. The position sensor may have any suitable location and may be coupled to an end of the control spool, flow spool, and/or shaft. The sensor may be located at an end of the shaft opposite the motor shaft. The shaft may therefore extend through the control spool to connect to the sensor.

The position sensor may be any suitable sensor, for example a linear variable differential transformer (LVDT).

The LVDT may have four channels. The position sensor may be operable to measure the position of the control spool (and/or the flow spool and/or the shaft) and hence to determine whether the flow spool is open or closed, and to what degree.

The position sensor measuring the position of the control spool directly may provide a better output for the purposes of control logic applied to the direct drive valve. The position sensor measuring the position of the flow spool may advantageously provide a better output for monitoring the output of the direct drive valve.

The direct drive valve may comprise a sensor arranged to measure rotation of the motor shaft (e.g. a rotary variable differential transformer RVDT or other rotary sensor) to control the electric motor rotation and the displacement of the control spool indirectly. The direct drive valve may comprise a pressure sensor operable to detect pressure in the first chamber and/or second chamber, for controlling the direct drive valve. The pressure sensor may be a delta pressure sensor between the first chamber and second chamber.

The direct drive valve may have duplex hydraulic architecture for redundancy. For example the control spool may be a first control spool, the flow spool may be a first flow spool, the shaft may be a first shaft, etc. The direct drive valve may comprise: a second flow spool operable to control fluid flow through the direct drive valve; and a second control spool located within the second flow spool, wherein the actuator is operable to drive the second control spool relative to the second flow spool, wherein the direct drive valve is configured such that in use movement of the second control spool relative to the second flow spool causes the second flow spool to be actuated by fluid pressure.

Thus, the valve may comprise a second control spool and flow spool each substantially identical to the first control spool and first flow spool, operable in the same way, providing a second flow architecture. The second architecture may be driven by the same actuator e.g. the same eccentric motor shaft, and may be driven in synchronization with the first control spool and flow spool. The valve may comprise a second version of each component as described herein, except for the motor and motor shaft. The components of the second architecture may be in a mirrored configuration to the first components described herein.

Advantageously, the same direct drive valve can provide flow control of two flow supplies via one flow supply being inputted to the first flow spool and first sleeve and one to the second flow spool and second sleeve. This is particularly advantageous in systems requiring redundancy wherein two independent but corresponding flow supplies are intended to have the same flow control applied by the valve. In other words, the direct drive valve provides a means of mirroring the flow control applied to the first supply to the second supply, e.g. for redundancy.

According to the second aspect of the invention a method of controlling a direct drive valve for controlling fluid flow is provided, comprising: supplying fluid to the direct drive valve, the direct drive valve comprising a flow spool operable to control fluid flow through the direct drive valve, and a control spool located within the flow spool; and controlling fluid flow through the direct drive valve by driving the control spool relative to the flow spool and thereby actuating the flow spool by fluid pressure.

The method may comprise actuating the flow spool relative to the control spool using fluid pressure and thereby returning the flow spool to an initial relative position with the control spool. The method may comprise, as a result of actuating the flow spool, stopping actuation thereof by the fluid pressure. Thus, the method may comprise using fluid pressure to move the flow spool to match movement of the control spool.

The direct drive valve may be a direct drive valve as described herein with reference to the first aspect of the invention, and/or a direct drive valve having any of the optional features described in respect of the first aspect.

The following is a detailed description of embodiments of a direct drive valve according to the disclosure with reference to the figures.

FIG. 1 shows a direct drive valve 10. The direct drive valve 10 is configured to control the output of fluid supplied to it. The direct drive valve 10 can therefore be used, for example, in an aircraft hydraulic system to control the hydraulic fluid supplied to either side of a piston associated with a control surface actuator to thereby actuate the control surface.

The direct drive valve 10 has a supply port 20, a plurality of return ports 30, a first control port 40 and a second control port 50. The supply port 20 is configured to receive supply fluid at a supply pressure (e.g. higher than a return pressure). The first control port 40 and second control port 50 are configured to output the supply fluid or receive return fluid dependent on the operation of the valve as described in more detail herein. The return ports 30 are configured to output returned fluid e.g. at a return pressure.

Figure 2:
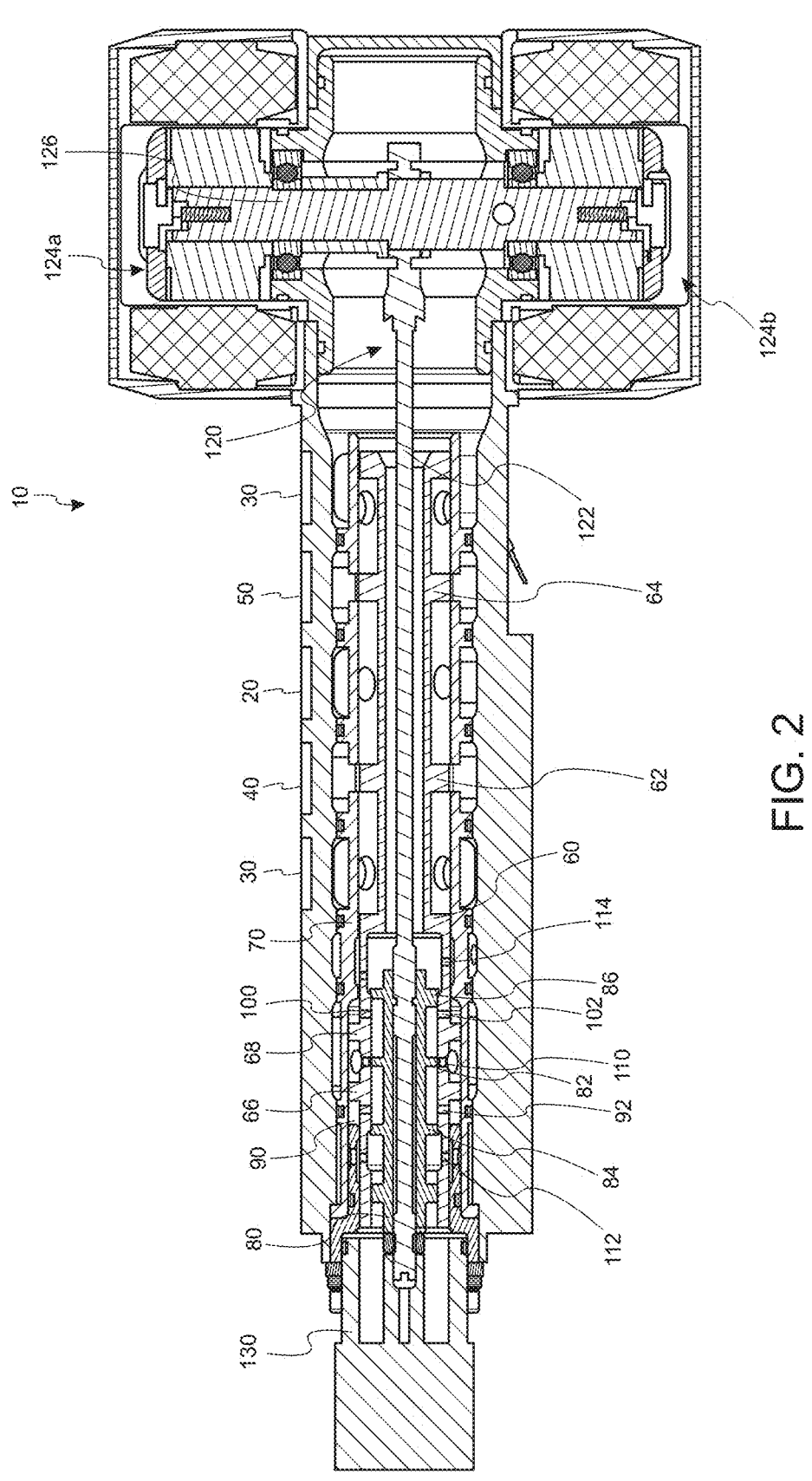
FIG. 2 shows the direct drive valve of FIG. 1 in cross-section.

FIG. 2 shows the direct drive valve 10 in cross-section. The direct drive valve 10 comprises a flow spool 60 within a sleeve 70. The flow spool 60 comprises first flow spool land 62 and a second flow spool land 64. The first and second flow spool lands 62, 64 divide the interior of the sleeve 70 into fluidly sealed segments.

Figure 3:
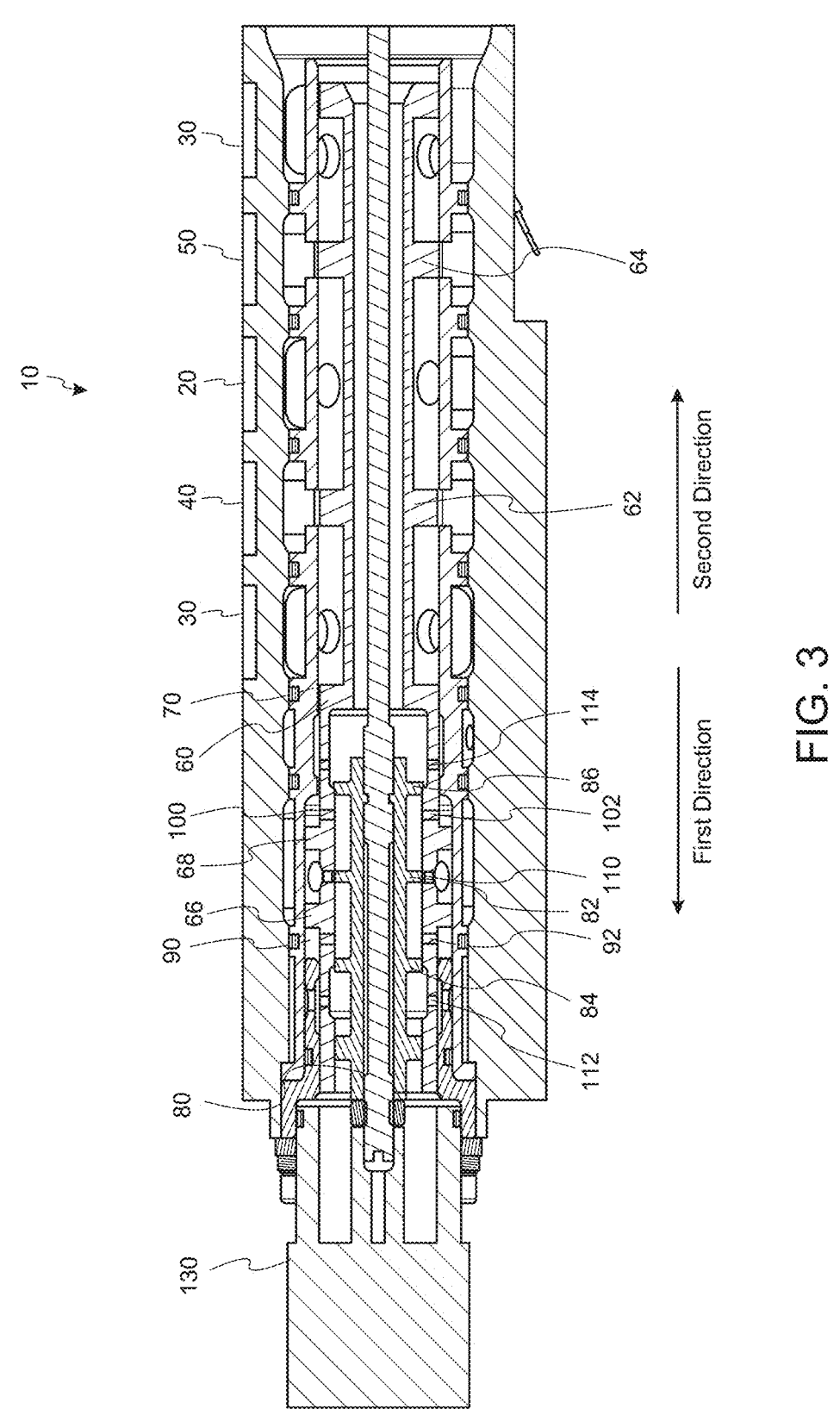
FIG. 3 shows a direct drive valve in cross-section in a first position.

With the flow spool 60 is a first position as depicted in FIG. 2 and FIG. 3 the first flow spool land 62 seals and blocks the first control port 40 and the second flow spool land 64 seals and blocks the second control port 50. In the first position, the first and second flow spool lands 62, 64 separate (e.g. fluidly isolate) the supply port 20 and return ports 30 from being in fluid communication with any of the ports.

Therefore, with the flow spool 60 in the first position, supply fluid provided to supply port 20 is not released by the direct drive valve 10 to any of the ports 30, 40, 50.

With reference to FIG. 3, the direct drive valve 10 comprises a first chamber 90 and a second chamber 100. The first chamber 90 is bounded by an exterior surface of the flow spool 60, a first radial protrusion 66 and the interior surface of the sleeve 70. The second chamber 100 is bounded by an exterior surface of the flow spool 60, a second radial protrusion 68 and the interior surface of the sleeve 70.

The first chamber 90 is configured such that when sufficiently high pressure is supplied to first chamber 90 then force acts (e.g. on the second radial protrusion 68) to urge the flow spool 60 in a second direction (rightward in the orientation of FIG. 3). The second chamber 100 is configured such that when sufficiently high pressure is supplied to second chamber 100 a force acts (e.g. on the first radial protrusion 66) to urge the flow spool 60 in a first direction (leftward in the orientation of FIG. 3), opposite the second direction. In other words, increased pressure supplied to the first chamber 90 would urge the flow spool 60 to the right-hand side in FIG. 3, i.e. the second direction, and increased pressure supplied to the second chamber 100 would urge the flow spool 60 to the left-hand side, i.e. the first direction, in FIG. 3. The driving force on the flow spool 60 may arise because of an imbalance of forces resulting from pressurisation of the first chamber 90 and/or the second chamber 100. For example, when the first chamber 90 is in fluid communication with fluid at supply pressure (e.g. via the pressure port 110 described herein) then a pressure differential is created between the first chamber 90 and second chamber 100 (and specifically between the fluid at supply pressure upstream of the first chamber 90 and the second chamber 100). The resulting imbalance of forces across the flow spool 60 result in the flow spool 60 being driven thereby.

To control the supply of pressurised fluid to the first chamber 90 and the second chamber 100 the direct drive valve 10 comprises a control spool 80 located within the flow spool 60. The control spool 80 has a first land 82, a second land 84, and a third land 86 that divides the interior of the flow spool 60 into segments.

The flow spool 60 comprises a pressure port 110 that is in fluid communication with the supply port 20 at supply pressure and is configured to permit supply fluid to the interior of the flow spool 60.

The flow spool 60 also comprises a first chamber port 92 and a second chamber port 102. The first chamber port 92 is configured to provide fluid communication between the first chamber 90 and the interior of the flow spool 60. The second chamber port 102 is configured to provide fluid communication between the second chamber 100 and the interior of the flow spool 60.

The flow spool 60 also comprises return ports 112 and 114 that are fluidly connected to the return port 30 for return fluid.

With the control spool 80 in a first position as depicted in FIG. 2 and FIG. 3, the first land 82 blocks pressure port 110. In this position no fluid at supply pressure is supplied to the first chamber 90 or the second chamber 100. Further, the second land 84 blocks the first chamber 90 from being in fluid communication with return port 112 and the third land 86 blocks the second chamber 100 from being in fluid communication with the return port 114. As such, fluid forces on the flow spool 60 are balanced. Hence, in the first position, the flow spool 60 is held fixed in place. Any movement would require fluid in the first and second chambers 90, 100 to be evacuated which is prevented by the control spool.

Figure 4:
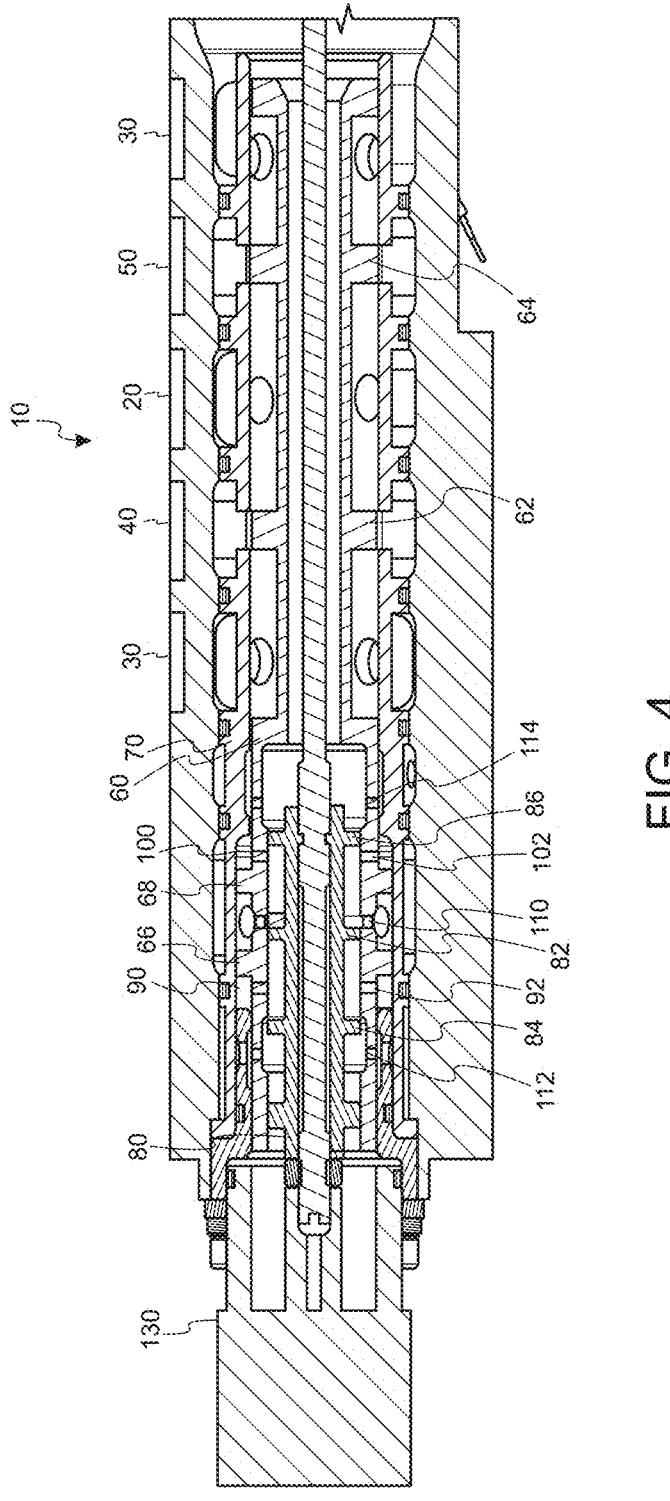
FIG. 4 shows a control spool of a direct drive valve in a second position.

With the control spool 80 in a second position, i.e. moved in the first direction to the left-hand side of FIGS. 2 and 3 as shown in FIG. 4, the pressure port 110 is placed in fluid communication with the second chamber port 102 and the second chamber 100, and the first chamber port 92 is placed in fluid communication with the return port 112. In this position, fluid at supply pressure is supplied to the second chamber 100 so a pressure differential is created, and due to the pressure supplied to the second chamber 100, as well as the connection of the first chamber 90 to the return port 112, the flow spool 60 is urged in the first direction (to the left-hand side of the figure), i.e. in the same direction as the control spool 80. Fluid enters the second chamber 100 from the pressure port 110 and is evacuated from the first chamber 90 to the return port 112.

Figure 5:
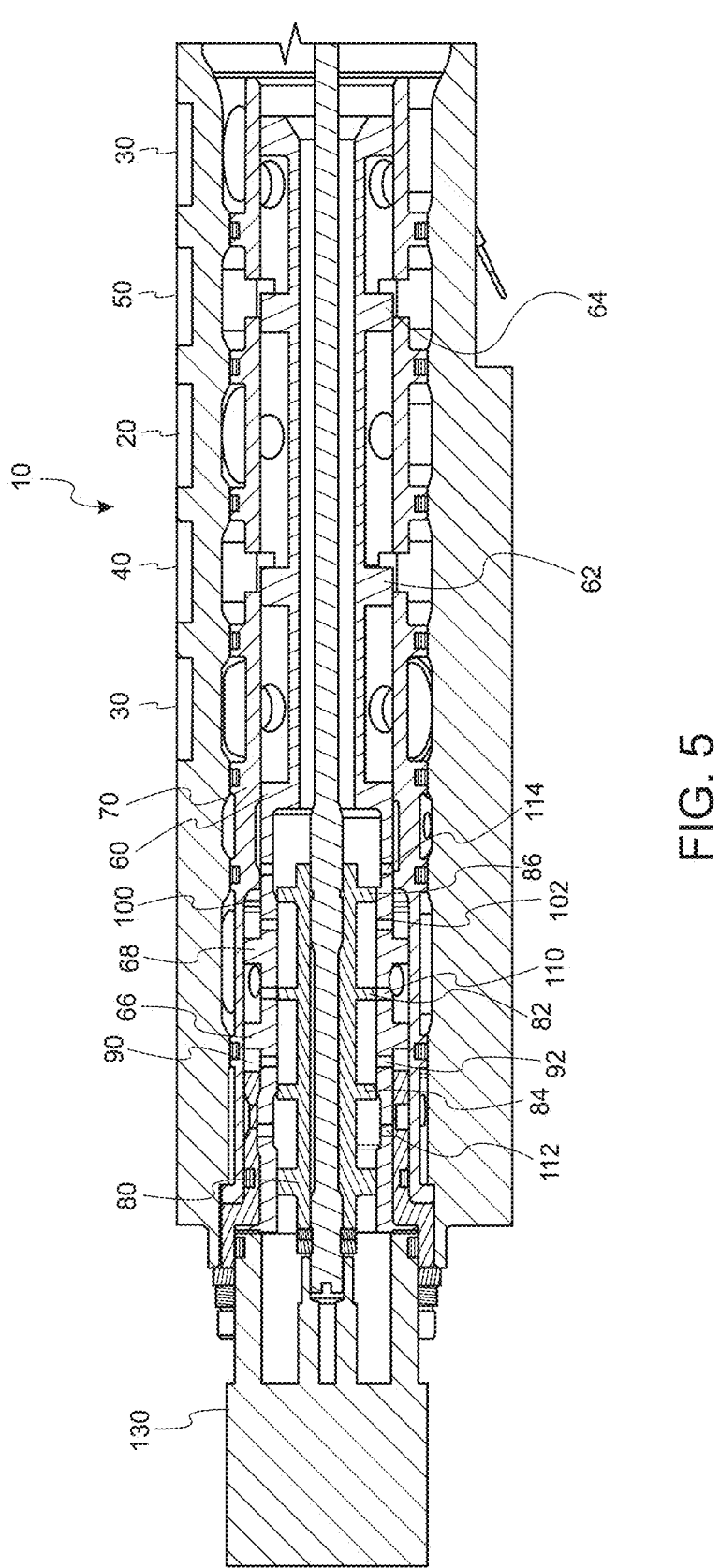
FIG. 5 shows the control spool and flow spool in the second position.

The flow spool 60 therefore moves in the same direction as the control spool 80 until the first land 82 is re-aligned with the pressure port 110 and blocks the pressure port 110 as shown in FIG. 5. The supply fluid is therefore cut off from the second chamber 100 and the flow spool 60 therefore stops moving. With the flow spool 60 in the second position the supply port 20 is placed in fluid communication with the first control port 40 and the second control port 50 is placed in fluid communication with the return port 30 due to the positions of the first and second flow spool lands 62, 64 relative to the ports. The further the control spool 80 is moved, the more the flow spool 60 is moved, and hence the supply port 20 can be opened more by moving the control spool 80 more.

To return the flow spool 60 to the first position as shown in FIG. 2 and FIG. 3 the inverse sequence is applied. That is, the control spool 60 is returned to the first position which places the pressure port 110 in fluid communication with first chamber port 92 and the first chamber 90, and the second chamber 100 is placed in fluid communication with the return port 114 through the second chamber port 102. In this position, due to the pressure supplied to the first chamber 90 and the fluid connection between the second chamber 100 and the return port 114, the flow spool 60 is urged to the second direction (to the right-hand side of the figure) i.e. in the same direction as the control spool 80. Fluid enters the first chamber 90 from the pressure port 110 and is evacuated from the second chamber 100 to the return port 114.

The flow spool 60 moves in the same direction as the control spool 80 until the first land 82 is aligned with the pressure port 110 and blocks the pressure port 110 again as shown in FIG. 2 and FIG. 3. With the flow spool 60 in the first position the first control port 40 and the second control port 50 are blocked by the first and second flow spool lands 62, 64, respectively.

Figure 6:
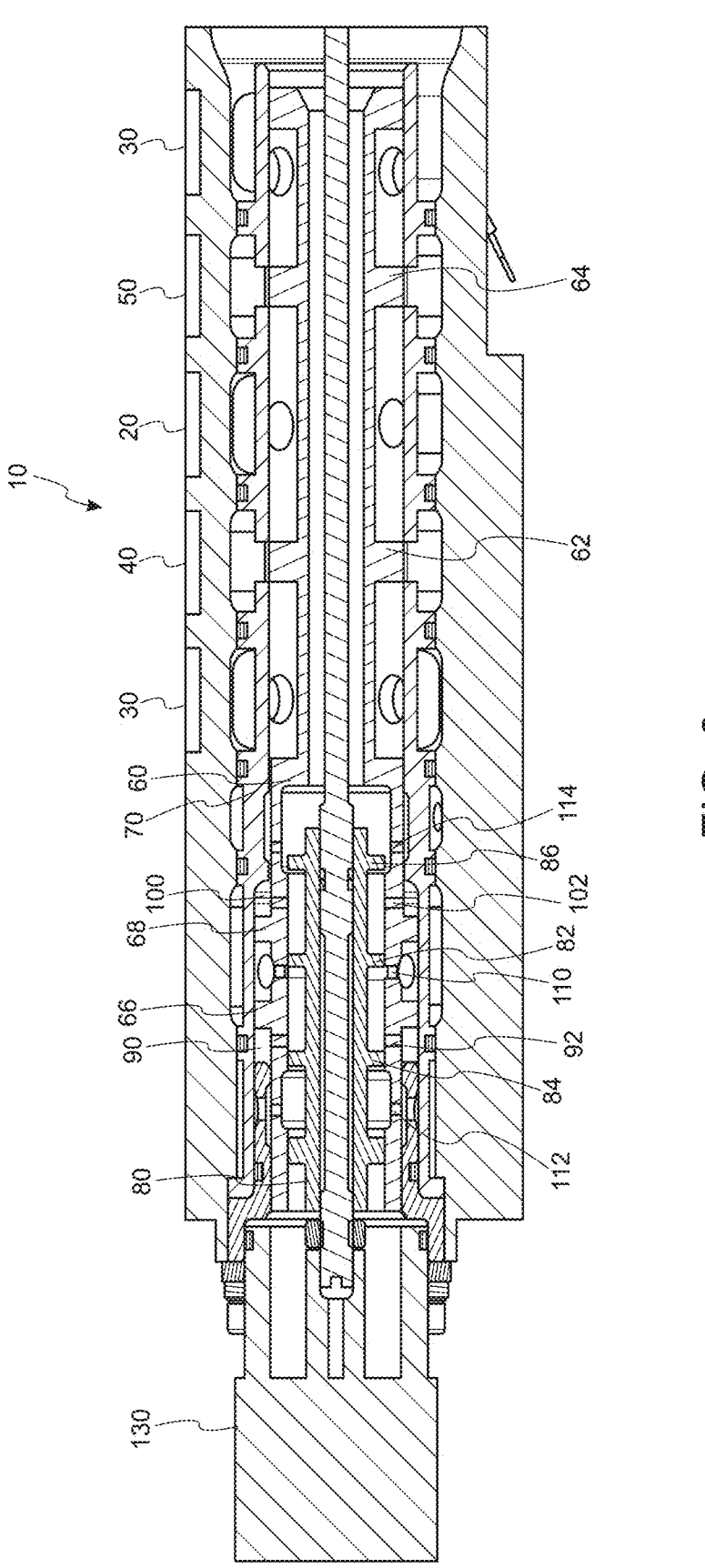
FIG. 6 shows a direct drive valve in cross-section in a fourth position.

With the control spool 80 in a third position, i.e. moved in the second direction (to the right-hand side) of FIGS. 2 and 3 as shown in FIG. 6, the pressure port 110 is placed in fluid communication with the first chamber port 92 and the first chamber 90, and the second chamber port 102 is in fluid communication with the return port 114. In this position, due to the pressure supplied to the first chamber 90 and the fluid connection between the second chamber 100 and the return port 114, flow spool 60 is urged in the second direction (to the right hand side of the figure) of the figure, i.e. in the same direction as the control spool 80. Fluid enters the first chamber 90 from the pressure port 110 and is evacuated from the second chamber 100 to the return port 114.

Figure 7:
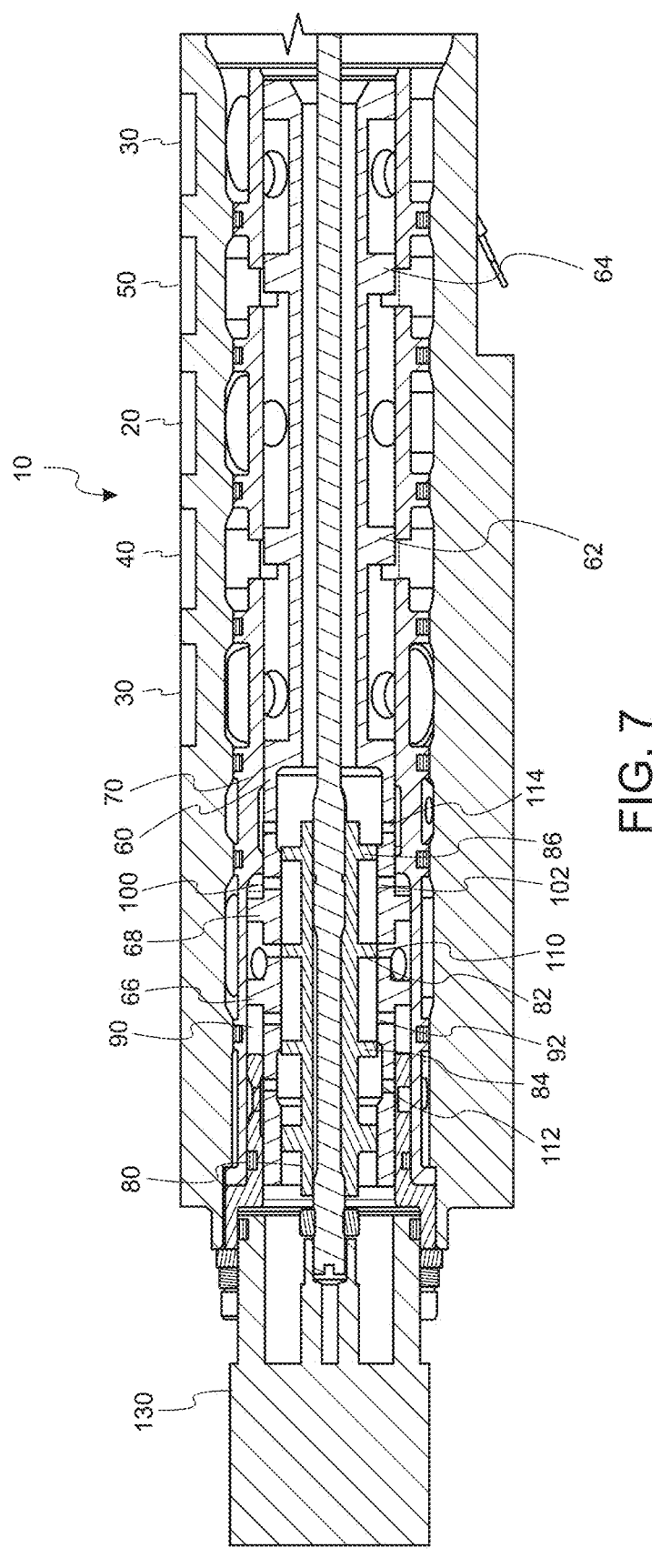
FIG. 7 shows a direct drive valve in cross-section in a fifth position.

The flow spool 60 moves in the same direction as the control spool 80 until the first land 82 blocks the pressure port 110 as shown in FIG. 7. With the flow spool 60 in the third position the supply port 20 is placed in fluid communication with the second control port 50 and the first control port 40 is placed in fluid communication with the return port 30 due to the positions of the first and second flow spool lands 62, 64 relative to the ports.

To return the flow spool 60 to the first position as shown in FIG. 2 and FIG. 3 the inverse sequence is applied. That is, control spool 60 is returned to the first position which places the pressure port 110 in fluid communication with the second chamber port 102 and the second chamber 100, and the first chamber 90 is placed in fluid communication with the return port 112 through the first chamber port 92. In this position, due to the pressure supplied to the second chamber 100 and the fluid connection between the first chamber 90 and the return port 124, the flow spool 60 is urged in the first direction (to the left-hand side of the figure), i.e. in the same direction as the control spool 80. Fluid enters the second chamber 100 from the pressure port 110 and is evacuated from the first chamber 90 to the return port 112.

The flow spool 60 moves in the same direction as the control spool 80 until first land 82 blocks the pressure port 110 as shown in FIG. 2 and FIG. 3. With the flow spool 60 in the first position the first control port 40 and the second control port 50 are blocked by the first and second flow spool lands 62, 64, respectively.

In other words, movement of the control spool 80 in the first direction or the second direction causes the flow spool 60 to follow in the same direction until the pressure port 110 is re-aligned with, and hence blocked by, the first land 82. That is, movement of the control spool 80 causes hydraulic follow up of the flow spool 60 and therefore opening and closing of the first control port 40 and second control port 50 by the flow spool 60 is controlled by positioning of the control spool 80.

As shown in FIG. 2, the direct drive valve 10 comprises an actuator 120 that has a shaft 122 and a plurality of motors 124a, 124b coupled to the shaft 122 via an eccentric shaft 126. The shaft 122 is connected to the control spool 80 and extends through both the flow spool 60 and the control spool 80. The actuator 120 is thereby operable to move the control spool 80 relative to the flow spool 60 between the first, second and third positions described previously.

Also shown in FIG. 2, the direct drive valve 10 comprises a position sensor 130 connected to the shaft 122 which is operable to measure the position of the control spool 80 based on the position of the shaft 122. The output from the position sensor 130 can therefore be used to determine whether the flow spool 60 is positioned to open or close the first control valve 40 or the second control valve 50 and to what degree. The position sensor 130 may alternatively monitor the position of the flow spool 60 if desired.

Figure 8:
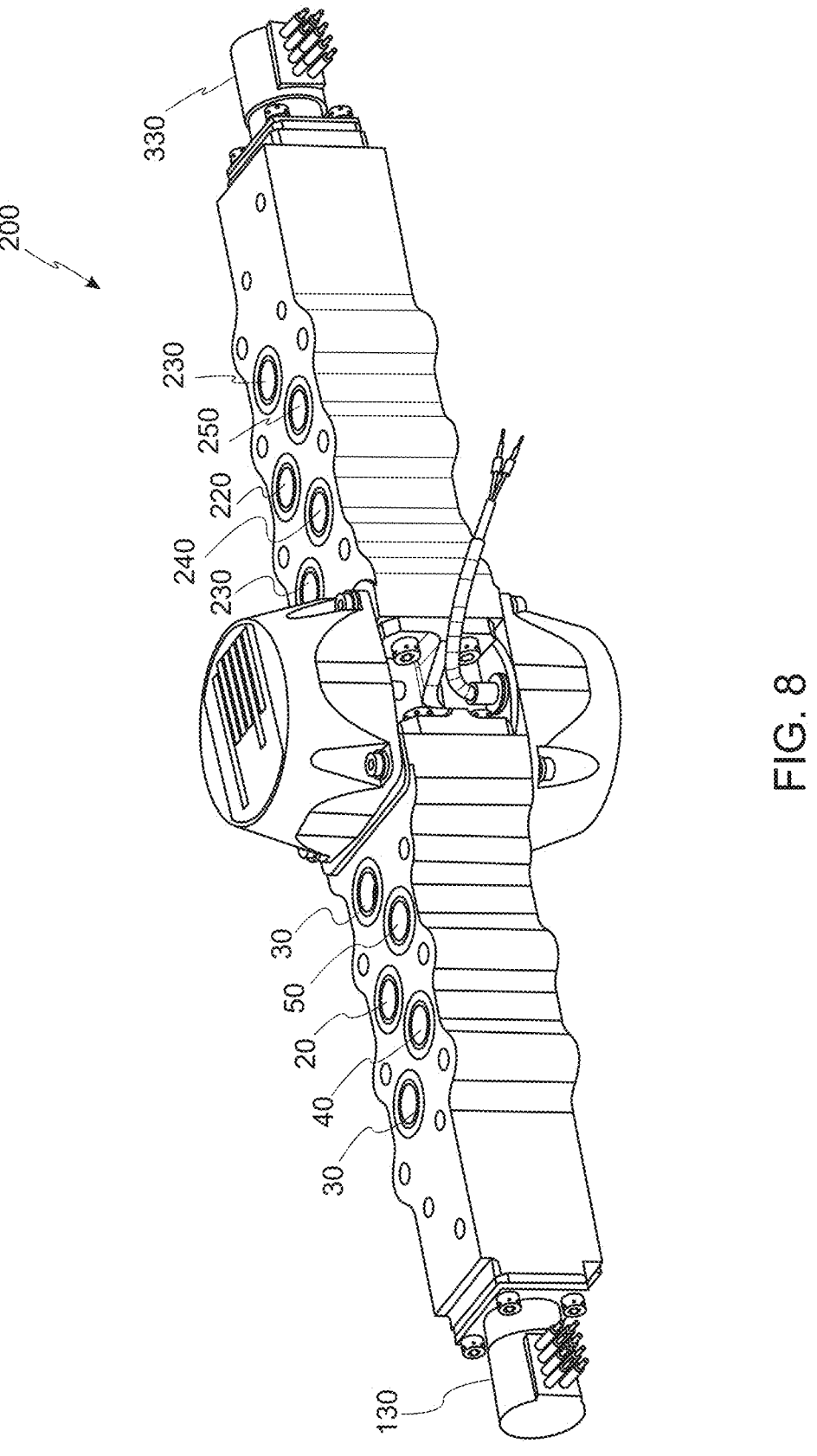
FIG. 8 shows a direct drive valve.

FIG. 8 shows another direct drive valve 200. The direct drive valve 200 is configured to control the output of fluid supplied to it. The direct drive valve 200 can therefore be used, for example, in an aircraft hydraulic system to control the hydraulic fluid supplied to either side of a piston associated with a control surface actuator to thereby actuate the control surface.

Direct drive valve 200 has the features of direct drive valve 10 and additionally comprises a second set of ports, i.e. supply port 220, return ports 230, a first control port 240 and a second control port 250. The supply port 220 is configured to receive supply fluid at supply pressure. The first control port 240 and second control port 250 are configured to output the supply fluid or receive return fluid dependent on the operation of the valve. The return ports 230 are configured to output returned fluid.

Figure 9:
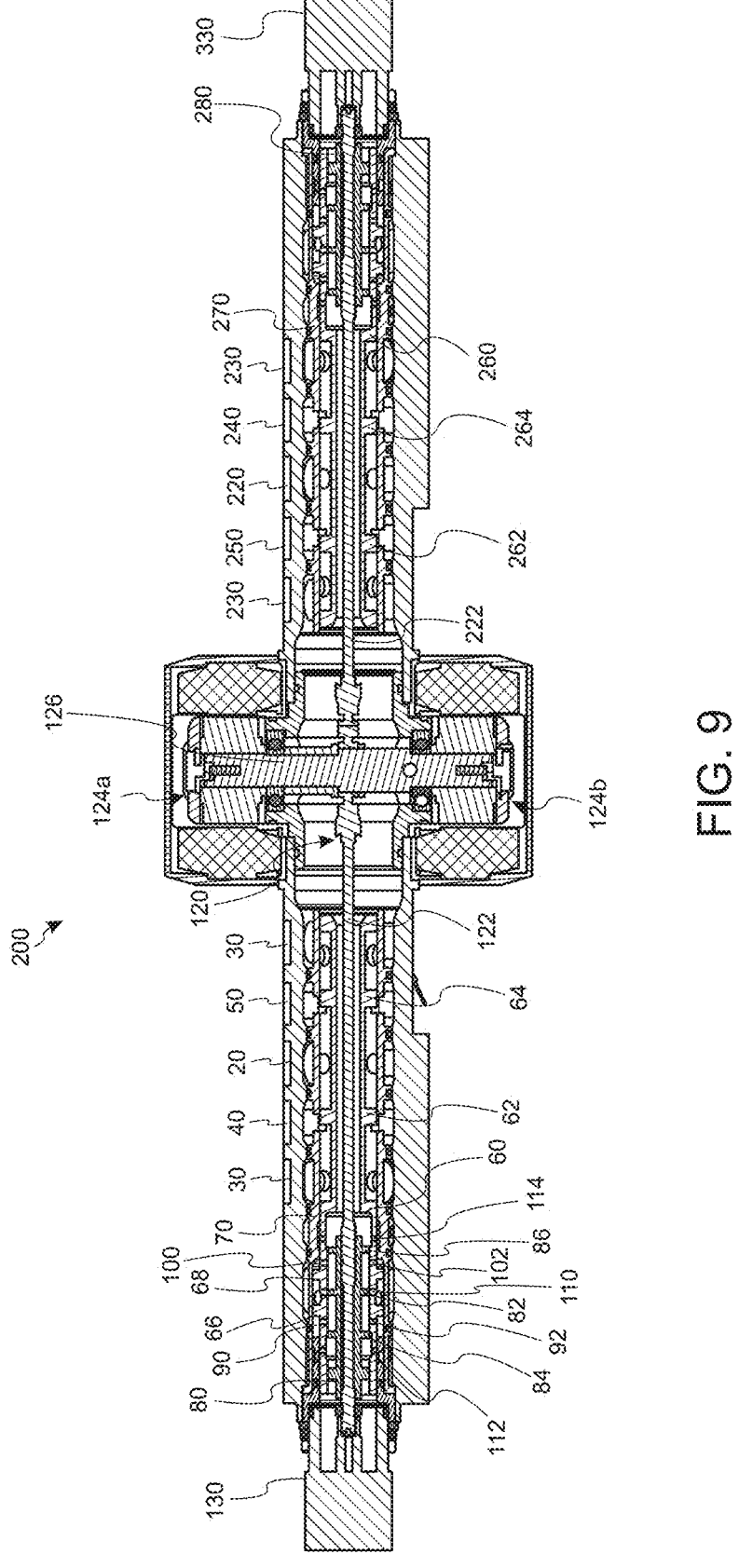
FIG. 9 shows the direct drive valve of FIG. 8 in cross-section.

With reference to FIG. 9, the direct drive valve 200 comprises a second flow spool 260 and a second control spool 280 with corresponding features and operation to the flow spool 60 and the control spool 80 shown in FIG. 3 but in a mirrored configuration.

In the direct drive valve 200 of FIGS. 8 and 9, the actuator 120 additionally comprises a second shaft 222 coupled to the eccentric shaft 126 and a second control spool 280. The second shaft 222 extends through both the second flow spool 260 and the second control spool 280. The actuator 120 is therefore operable to move the second control spool 280 relative to the second flow spool 260 between its own first, second and third positions, analogous to those described previously with respect to the direct drive valve 10 shown in FIGS. 1 to 7.

The direct drive valve 200 of FIGS. 8 and 9 also comprises a second position sensor 330 connected to the second shaft 222 which is operable to measure the position of the second control spool 280 based on the position of the second shaft 222. The output from the second position sensor 330 can therefore be used to determine whether the second flow spool 260 is positioned to open or close the first control valve 240 or second control valve 250 of the second set of ports and to what degree.

Therefore, the direct drive valve 200 can be connected to two separate (e.g. parallel) hydraulic circuits and can provide corresponding control to each. In particular, in the context of aircraft hydraulic systems, the first set of ports may be connected to a primary hydraulic system and the second set of ports may be connected to a corresponding redundant hydraulic system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A direct drive valve for controlling fluid flow, comprising:
   a flow spool operable to control fluid flow through the direct drive valve;
   a control spool located within the flow spool; and
   an actuator operable to drive the control spool relative to the flow spool; wherein the actuator comprises a shaft that extends through the flow spool and is attached to the control spool for actuating the control spool;
   wherein the direct drive valve is configured such that in use movement of the control spool relative to the flow spool causes the flow spool to be actuated by fluid pressure.

2. The direct drive valve of claim 1, wherein
   the flow spool comprises a pressure port for cooperation with the control spool, wherein the pressure port is configured to receive supply fluid;

the control spool comprises a first land configured to prevent fluid flow through the pressure port when the pressure port and the first land are aligned; and
   the flow spool and the control spool are configured such that in use:
      movement of the control spool relative to the flow spool in a first direction causes the first land to permit fluid flow through the pressure port such that the pressure port is in fluid communication with a second chamber for driving the flow spool in the first direction, and
      movement of the control spool relative to the flow spool in a second direction causes the first land to permit fluid flow through the pressure port such that the pressure port is in fluid communication with a first chamber for driving the flow spool in the second direction.

3. The direct drive valve of claim 1, wherein the shaft extends through both the flow spool and the control spool.

4. The direct drive valve of claim 1, wherein the actuator comprises:
   a motor configured to drive the control spool using the shaft.

5. The direct drive valve of claim 4, wherein the control spool is located further from the motor than the flow spool.

6. The direct drive valve of claim 1, wherein the flow spool is configured to provide fluid flow of 200 litres per minute or greater through the valve.

7. The direct drive valve of claim 1, further comprising:
   a position sensor configured to detect a position of the control spool and/or the flow spool.

8. The direct drive valve of claim 1, further comprising
   a second flow spool operable to control fluid flow through the direct drive valve; and
   a second control spool located within the second flow spool,
   wherein the actuator is operable to drive the second control spool relative to the second flow spool,
   wherein the direct drive valve is configured such that in use movement of the second control spool relative to the second flow spool causes the second flow spool to be actuated by fluid pressure.

9. A method of controlling a direct drive valve according to claim 1 for controlling fluid flow, the method comprising:
   supplying fluid to the direct drive valve; and
   controlling fluid flow through the direct drive valve by driving the control spool relative to the flow spool and thereby actuating the flow spool by fluid pressure.

10. The method of claim 9, further comprising:
   actuating the flow spool relative to the control spool using fluid pressure and thereby returning the flow spool to an initial relative position with the control spool and hence stopping actuation by the fluid pressure.

* * * * *